US009442602B2

(12) United States Patent
Tse et al.

(10) Patent No.: US 9,442,602 B2
(45) Date of Patent: Sep. 13, 2016

(54) INTERACTIVE INPUT SYSTEM AND METHOD

(75) Inventors: Edward Tse, Calgary (CA); Mark Fletcher, Ottawa (CA); Neal Hanebury Wilding, Calgary (CA); Sean Thompson, Calgary (CA); Derek Tse, Calgary (CA); Michael Andrew Strilchuk, Calgary (CA); Harold Gill, Calgary (CA); David Martin, Calgary (CA); Kathryn Rounding, Calgary (CA); Alan Peter Boykiw, Calgary (CA); Michael Boyle, Calgary (CA); Min Xin, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 32 days.

(21) Appl. No.: 13/524,752

(22) Filed: Jun. 15, 2012

(65) Prior Publication Data
US 2012/0319972 A1 Dec. 20, 2012

Related U.S. Application Data

(60) Provisional application No. 61/497,248, filed on Jun. 15, 2011, provisional application No. 61/565,299, filed on Nov. 30, 2011.

(51) Int. Cl.
*G06F 3/042* (2006.01)
*G06F 1/32* (2006.01)

(52) U.S. Cl.
CPC ............. *G06F 3/042* (2013.01); *G06F 1/3262* (2013.01); *G06F 2203/04106* (2013.01); *Y02B 60/1289* (2013.01)

(58) Field of Classification Search
CPC .. G06F 3/0383; G06F 3/04815; G06F 3/005; G06F 3/011; G06F 3/0304; G06F 3/03547; G06F 2221/2105; G06F 3/042; G06F 1/3203; G06F 1/3231; G06F 3/0625; G06F 3/0634; G06F 2203/04106; H04N 21/44218; Y02B 60/1289
USPC .................................. 345/156–158, 173–183
See application file for complete search history.

(56) References Cited

U.S. PATENT DOCUMENTS 4,123,747 A * 10/1978 Lancto ................. G06Q 20/341
235/380
5,448,263 A 9/1995 Martin
(Continued)

FOREIGN PATENT DOCUMENTS

WO 2011150510 A1 12/2011
WO 2012171110 A1 12/2012

OTHER PUBLICATIONS

International Search Report and Written Opinion issued for PCT/CA2012/000588, mailed Aug. 28, 2012, 9 pages.

*Primary Examiner* — Sanjiv D Patel
(74) *Attorney, Agent, or Firm* — Perkins Coie LLP

(57) ABSTRACT

An interactive input system comprises an interactive surface; at least one proximity sensor in proximity with the interactive surface and generating output signifying user proximity to the interactive surface; and processing structure configured to process user input generated in response to user interaction with said interaction input system and output from the at least one proximity sensor, said processing structure controlling interactive input system operation based upon at least one of said user input and proximity sensor output.

38 Claims, 15 Drawing Sheets

(56) References Cited

U.S. PATENT DOCUMENTS

| | | | |
|---|---|---|---|
| 6,058,485 A * | 5/2000 | Koziuk et al. | 713/320 |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 2002/0098001 A1 * | 7/2002 | Dahl | 396/429 |
| 2005/0075764 A1 * | 4/2005 | Horst | B60R 25/25 701/19 |
| 2005/0254505 A1 | 11/2005 | Chang et al. | |
| 2005/0259080 A1 * | 11/2005 | Cole | G06F 3/04895 345/168 |
| 2005/0285845 A1 * | 12/2005 | Dehlin | 345/173 |
| 2007/0273842 A1 | 11/2007 | Morrison et al. | |
| 2010/0085203 A1 * | 4/2010 | Kahn | G01P 13/00 340/669 |
| 2010/0103330 A1 | 4/2010 | Morrison et al. | |
| 2010/0176823 A1 * | 7/2010 | Thompson | G06K 9/00026 324/676 |
| 2010/0205001 A1 * | 8/2010 | Knudsen | G06F 19/322 705/2 |
| 2010/0225595 A1 * | 9/2010 | Hodges | G06F 3/0425 345/173 |
| 2010/0245563 A1 | 9/2010 | Golovchinsky et al. | |
| 2011/0050650 A1 | 3/2011 | McGibney et al. | |
| 2011/0134300 A1 * | 6/2011 | Chung | 348/333.01 |
| 2011/0296163 A1 * | 12/2011 | Abernethy | G06F 1/3203 713/100 |
| 2012/0131229 A1 * | 5/2012 | McCarthy | G06F 1/3203 710/5 |
| 2012/0166849 A1 * | 6/2012 | Koniaris | G06F 1/3203 713/323 |
| 2013/0234992 A1 * | 9/2013 | Hodges | G06F 3/0425 345/175 |

* cited by examiner

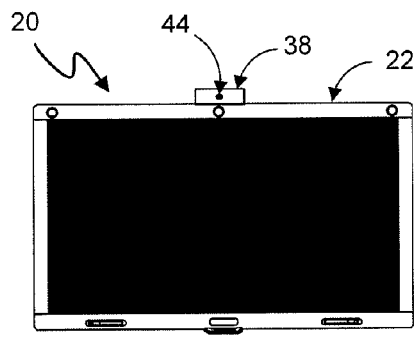
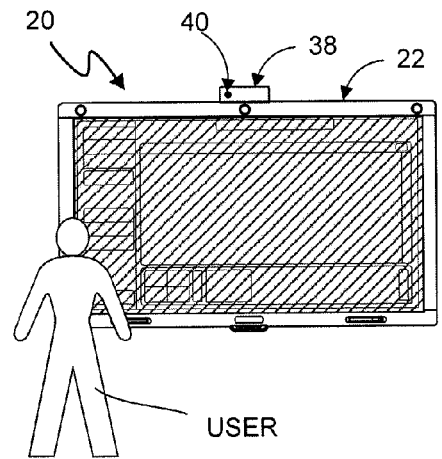
FIG. 7
FIG. 8A
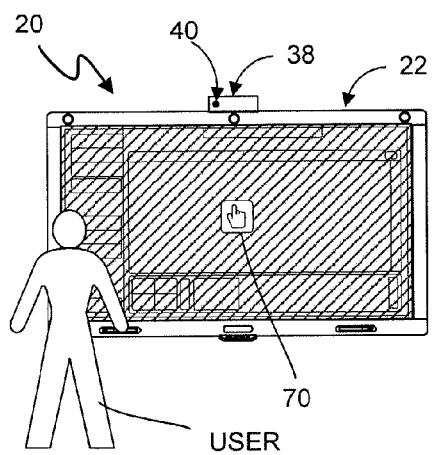
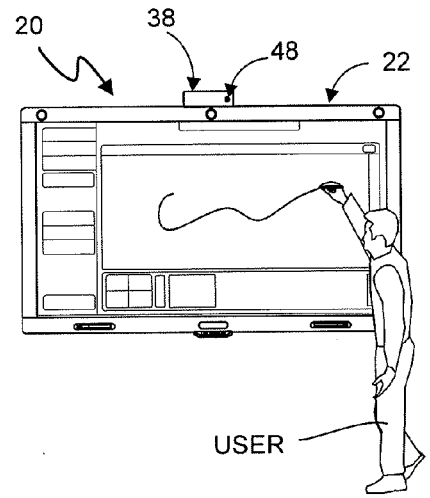
FIG. 8B
FIG. 9

INTERACTIVE INPUT SYSTEM AND METHOD

CROSS REFERENCE TO RELATED APPLICATION

This application claims the benefit of U.S. Provisional Application Ser. No. 61/497,248 filed on Jun. 15, 2011 and entitled "INTERACTIVE INPUT SYSTEM AND METHOD" and U.S. Provisional Application Ser. No. 61/565,299 filed on Nov. 30, 2011 and entitled "INTERACTIVE INPUT SYSTEM AND METHOD", the contents of which are incorporated herein by reference in their entireties.

FIELD OF THE INVENTION

The present invention relates to an interactive input system and method of using the same.

BACKGROUND OF THE INVENTION

Interactive input systems that allow users to inject input (e.g. digital ink, mouse events etc.) into an application program using an active pointer (e.g. a pointer that emits light, sound or other signal), a passive pointer (e.g. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the entire contents of which are incorporated by reference; touch systems comprising touch panels employing electromagnetic, capacitive, acoustic or other technologies to register pointer input; laptop and tablet personal computers (PCs); personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a finger, pointer, pen tool etc. touches the optical waveguide surface, due to a change in the index of refraction of the optical waveguide, causing some light to escape from the optical waveguide at the touch point. In such multi-touch interactive input systems, the machine vision system captures images including light that escapes the optical waveguide, reflects off each pointer contacting the optical waveguide and then passes through the optical waveguide, and processes the images to identify the position of each pointer on the optical waveguide surface based on the point(s) of escaped light for use as input to application programs.

U.S. Patent Application Publication No. 2011/0050650 to McGibney et al., assigned to SMART Technologies ULC, discloses an interactive input system with improved signal-to noise ratio and an image capture method. The interactive input system comprises an optical waveguide associated with a display having a top surface with a diffuser for displaying images projected by a projector and also for contact by an object, such as a finger, pointer or the like. The interactive input system also includes two light sources. Light from a first light source is coupled into the optical waveguide and undergoes total internal reflection within the optical waveguide. Light from a second light source is directed towards a back surface of the optical waveguide opposite to its top surface. At least one imaging device, such as a camera, has a field of view looking at the back surface of the optical waveguide and captures image frames in a sequence with the first light source and the second light source on and off alternately. Pointer interactions with the top surface of the optical waveguide can be recorded as handwriting or drawing to control execution of an application program.

Other arrangements have also been considered. For example, U.S. Patent Application Publication No. 2010/010330 to Morrison et al., assigned to SMART Technologies ULC, discloses an image projecting method comprising determining the position of a projection surface within a projection zone of at least one projector based on at least one image of the projection surface, the projection zone being sized to encompass multiple surface positions and modifying video image data output to the at least one projector so that the projected image corresponds generally to the projection surface. In one embodiment, a camera mounted on a projector is used to determine the location of a user in front of the projection surface. The position of the projection surface is then adjusted according to the height of the user.

U.S. Patent Application Publication No. 2007/0273842 to Morrison et al., assigned to SMART Technologies ULC, discloses a method of inhibiting a subject's eyes from being exposed to projected light when the subject is positioned in front of a background on which an image is displayed. The method comprises capturing at least one image of the background including the displayed image, processing the captured image to detect the existence of the subject and to locate generally the subject and masking image data used by the projector to project the image corresponding to a region that encompasses at least the subject's eyes.

Researchers have also identified different proximity zones in social interaction. A description of the division and nature of different proximity zones is disclosed in the reference entitled "The Hidden Dimension" authored by Edward T. Hall, published in 1966. Hall has identified four distinct proximity zones, namely an intimate zone, a personal zone, a social zone and a public zone.

While above-mentioned prior art describes various approaches for receiving user input, limited functionality is available for adapting the operating mode of interactive input systems based on a user's proximity relative to the interactive surface. It is therefore an object of the following to provide a novel interactive input system and method.

SUMMARY OF THE INVENTION

Accordingly, in one aspect there is provided an interactive input system comprising an interactive surface; at least one proximity sensor in proximity with the interactive surface and generating output signifying user proximity to the interactive surface; and processing structure configured to process user input generated in response to user interaction with said interaction input system and output from the at least one proximity sensor, said processing structure controlling interactive input system operation based upon at least one of said user input and proximity sensor output.

In one embodiment, the processing structure controls interactive input system operation based on both user input and proximity sensor output. The user input is generated in response to the user interaction with the interactive surface and in response to user interaction with at least one input device in communication with the processing structure such as for example, a keyboard and/or a mouse. The processing structure conditions the interactive input system to operate in a selected one of a plurality of operational modes based upon at least one of the user input and proximity sensor output.

In one embodiment, the operational modes comprise an interactive mode, a ready mode and a standby mode. The interactive input system is conditioned to operate in the standby mode in the absence of proximity sensor output, signifying user proximity to the interactive surface, for a period of time exceeding a threshold period of time. The interactive input system is conditioned to the interactive mode from the standby mode in response to user input. The interactive input system is conditioned to the standby mode from the interactive mode upon actuation of an interactive input system power button.

In one embodiment, the at least one proximity sensor comprises a plurality of proximity sensors. At least one of the proximity sensors is configured to detect a user positioned in front of the interactive surface and other proximity sensors are configured to detect a user positioned adjacent a side of the interactive surface. The proximity sensors are positioned at spaced locations about the interactive surface and in one form are mounted on a bezel that at least partially surrounds the interactive surface.

In one embodiment, the interactive input system further comprises a status indicator for indicating the approximate position of a user in proximity to the interactive surface. The status indicator further indicates the interactive input system operational mode and comprises a plurality of illumination sources.

According to another aspect there is provided a method of operating an interactive input system comprising receiving input in response to user interaction with an interactive surface; receiving sensor output from at least one proximity sensor in response to user proximity to said interactive surface; and processing said input and said sensor output to determine an operating mode of the interactive input system.

According to yet another aspect there is provided an interactive board comprising an interactive surface; at least one proximity sensor configured to detect the presence of a user proximate to said interactive surface; and a status indicator configured to provide at least one of an indication that a user is proximate to the interactive surface and an indication of an interactive board operating mode.

According to yet another aspect there is provided an interactive board comprising an interactive surface; and a plurality of proximity sensors at spaced locations about said interactive surface, said proximity sensors being configured at least to detect the presence of a user positioned (i) in front of said interactive surface, and (ii) to a side of the interactive surface.

BRIEF DESCRIPTION OF THE DRAWINGS

Embodiments will now be described more fully with reference to the accompanying drawings in which:

FIG. 7 shows the interactive board with the interactive input system of FIG. 1 operating in a standby mode;

FIGS. 8A and 8B show the interactive board with the interactive input system of FIG. 1 operating in ready_initial and ready_final modes, respectively;

FIG. 9 shows the interactive board with the interactive input system of FIG. 1 operating in an interactive mode;

DETAILED DESCRIPTION OF THE EMBODIMENTS

Figure 1:
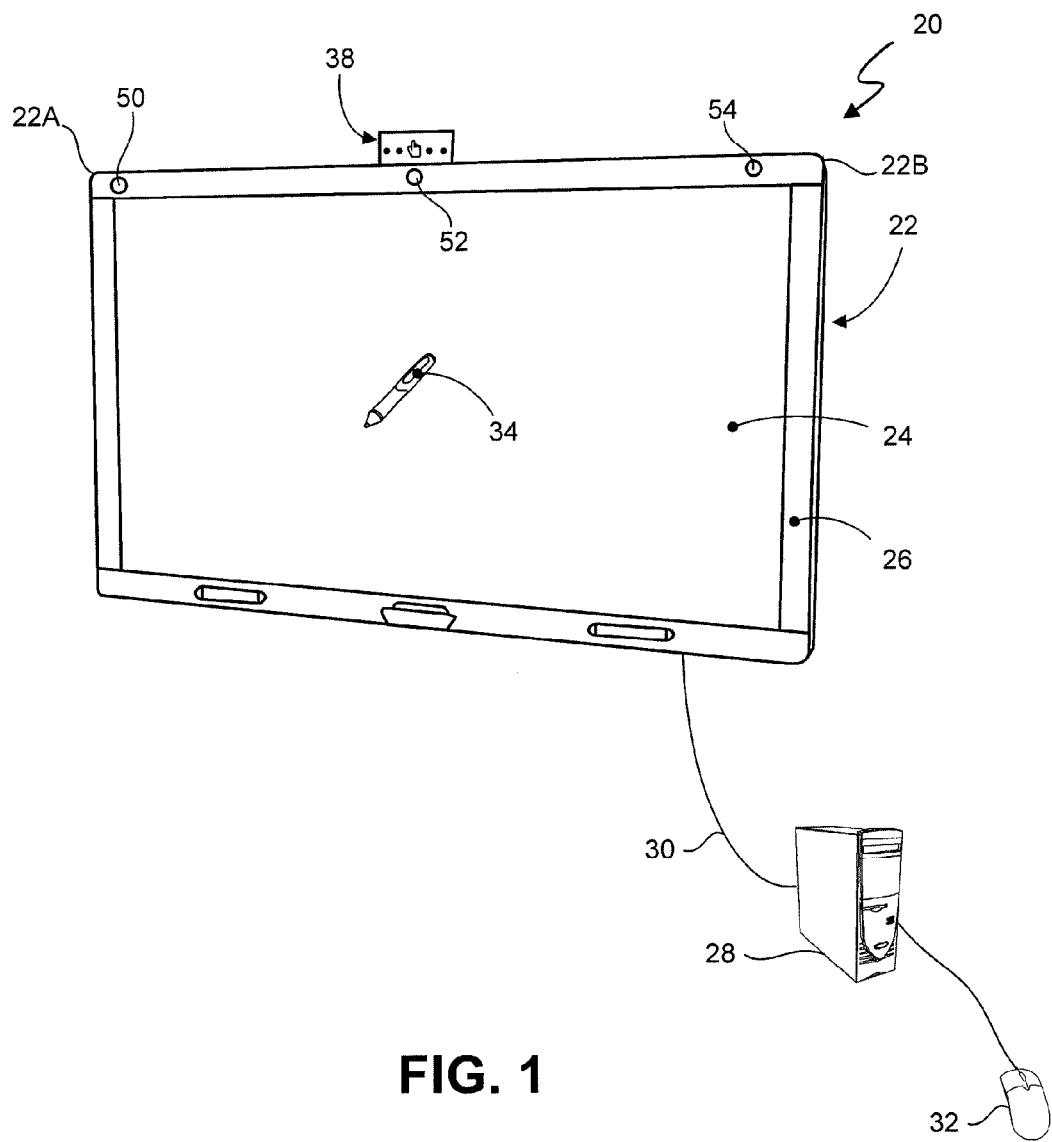
FIG. 1 is a perspective view of an interactive input system.

Turning now to FIG. 1, an exemplary interactive input system that allows a user to inject input such as digital ink, mouse events etc. into a running application program is shown and is generally identified by reference numeral 20. In this embodiment, interactive input system 20 comprises an interactive board 22 mounted on a vertical support surface such as for example, a wall surface or the like or otherwise supported or suspended in a generally upright orientation. Interactive board 22 comprises a generally planar, rectangular interactive surface 24 that is surrounded about its periphery by a bezel 26. An image, such as for example a computer desktop is displayed on the interactive surface 24. In this embodiment, the interactive board 22 comprises a liquid crystal display (LCD) panel or other suitable display device to display the images.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30 or other suitable wired or wireless connection. General purpose computing device 28 processes the output of the interactive board 22 and adjusts image data that is output to the interactive board 22 and presented on the LCD panel, if required, so that the image presented on the interactive surface 24 reflects pointer activity. In this manner, the interactive board 22 and general purpose computing device 28 allow pointer activity proximate to the interactive surface 24 to be recorded as writing or drawing or used to control execution of one or more application programs executed by the general purpose computing device 28.

Imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate.

The imaging assemblies are oriented so that their fields of view overlap and look generally across the entire interactive surface 24. In this manner, any pointer such as for example a user's finger, a cylinder or other suitable object, or a pen or eraser tool that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey the image frames to a master controller (not shown) accommodated by the interactive board 22. The master controller comprises a DSP or other suitable processing structure and processes the image frames to determine the position of the pointer in (x,y) coordinates relative to the interactive surface 24 using triangulation. The pointer coordinates are then conveyed to the general purpose computing device 28 which uses the pointer coordinates to update the image displayed on the LCD panel if appropriate. Pointer contacts on the interactive surface 24 can therefore be recorded as writing or drawing or used to control execution of application programs running on the general purpose computing device 28.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The general purpose computing device 28 may also comprise networking capability using Ethernet, WiFi, and/or other network format, to access shared or remote drives, one or more networked computers, or other networked devices.

The general purpose computing device 28 comprises a Microsoft Windows™ operating system such as for example Windows 7 and runs a host software application such as, for example SMART Meeting Pro™ offered by SMART Technologies ULC, on the operating system. In this embodiment, the host software application is installed to run as a system service. Installing the host software application in this manner requires registration of a dynamic link library (DLL) with the Windows™ operating system. The DLL can execute the host software application as a system service which allows the application to run without requiring user login. As is known, during execution, the SMART Meeting Pro™ application provides a graphical user interface comprising a canvas page or palette, that is presented on the interactive surface 24, and on which freeform or handwritten ink objects together with other computer generated objects can be input and manipulated via pointer interaction with the interactive surface 24.

The interactive input system 20 is able to detect passive pointers such as for example, a user's finger, a cylinder or other suitable objects as well as passive and active pen tools 34 that are brought into proximity with the interactive surface 24 and within the fields of view of the imaging assemblies. The user may also enter input or give commands through a mouse 32 or a keyboard (not shown) attached to or otherwise communicating with the general purpose computing device 28. Other input techniques such as voice or gesture-based commands may also be used for user interaction with the interactive input system 20.

As will be described below, the interactive input system 20 is operable in a plurality of modes. In this embodiment, the operating modes comprise a standby mode, a ready mode, and an interactive mode. The mode of operation of the interactive input system 20 is updated based on user interaction with the interactive input system or the presence of a user in proximity with the interactive surface 24. In this embodiment, user interaction with the interaction input system 20 comprises any input provided by a user to the interactive input system 20 including pointer activity made proximate to the interactive surface 24, input provided by the mouse 32 or keyboard (not shown), as well as voice or gesture-based commands. The presence of a user in proximity to the interactive surface 24 is detected through the use of a number of proximity sensors, as will be described.

Figure 2:
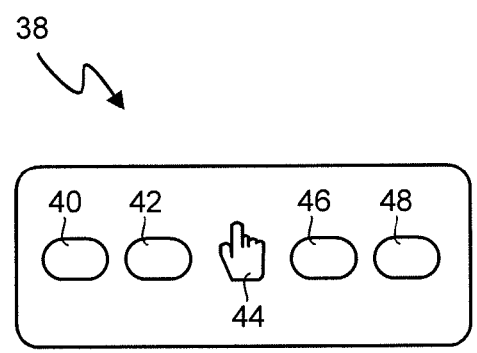
FIG. 2 is a front elevational view of a status indicator forming part of the interactive input system of FIG. 1.

The interactive input system 20 comprises a status indicator 38 mounted above the top portion of bezel 26 at a position approximately midway between the top corners 22a and 22b of the interactive board 22. As shown in FIG. 2, in this embodiment, the status indicator 38 comprises a series of five (5) indicators in the form of light emitting diodes (LEDs) 40, 42, 44, 46 and 48 or other suitable illumination sources to indicate the mode of operation of the interactive input system 20 as well as the approximate position of a user with respect to the interactive board 22.

Turning now to FIGS. 1 and 3A to 3C, interactive input system 20 also comprises one or more proximity sensors configured to sense or detect the presence of objects, such as a user, in proximity with the interactive board 22. The proximity sensors are in communication with the master controller. In this embodiment, the interactive input system 20 comprises three (3) proximity sensors 50, 52 and 54 mounted on the top portion of bezel 26. As can be seen, proximity sensors 50 and 54 are positioned near top corners 22a and 22b, respectively and proximity sensor 52 is positioned intermediate proximity sensors 50 and 54 at a point generally midway between the top corners 22a and 22b, respectively and adjacent the status indicator 38.

In this embodiment, each of the proximity sensors 50 and 54 is an ultrasonic proximity sensor capable of sensing the presence of objects within a detection range of between about 0.2 m and about 6.45 m and that has a relatively narrow detection angle. The proximity sensors 50 and 54 are positioned within the top portion of bezel 26 and are angled such that the detection profiles DP thereof generally overlap with one another at a region proximate to the interactive surface 24, as indicated by references DP50 and DP54, respectively, in FIG. 3A.

In this embodiment, proximity sensor 52 is a passive infrared (IR) proximity sensor such as that manufactured by Panasonic Electric Works under the part number EKMC 1601112. Proximity sensor 52 has a detection angle of approximately 94 degrees and has a detection range of approximately 5 meters. Proximity sensor 52 is positioned within the top portion of bezel 26 and is angled such that the detection profile DP thereof is directed generally outward from the interactive board 22, as indicated by reference numeral DP52 in FIG. 3B. In this embodiment proximity sensor 52 is configured to detect the presence of an object within its detection range, but does not calculate the distance between itself and the object it detects.

Figure 3A:
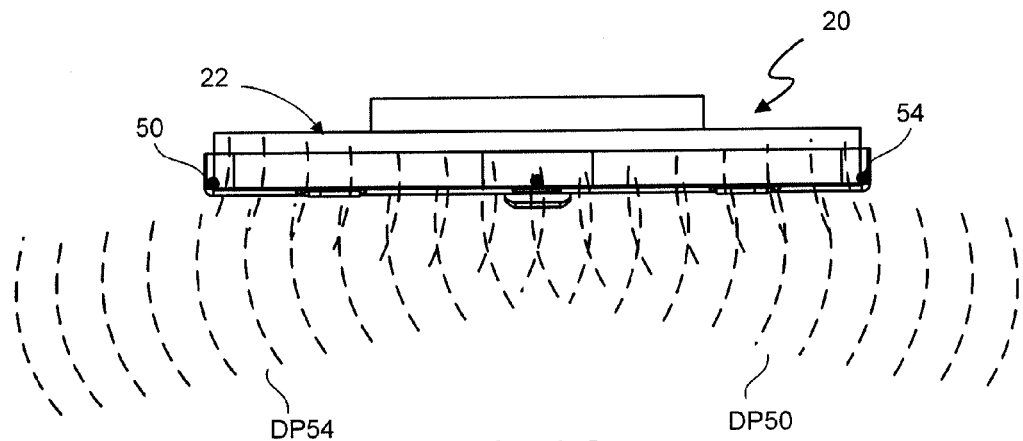
FIG. 3A is a top plan view of an interactive board forming part of the interactive input system of FIG. 1, showing the detection profiles for two ultrasonic proximity sensors associated therewith.
Figure 3B:
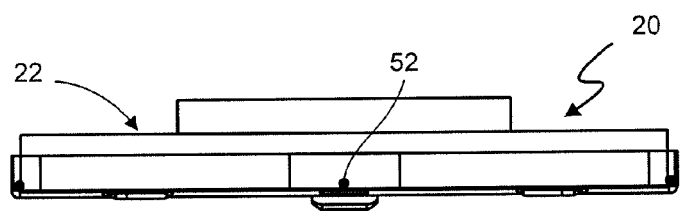
FIG. 3B is a top plan view of the interactive board showing the detection profile for a passive infrared (IR) proximity sensor associated therewith.
Figure 3C:
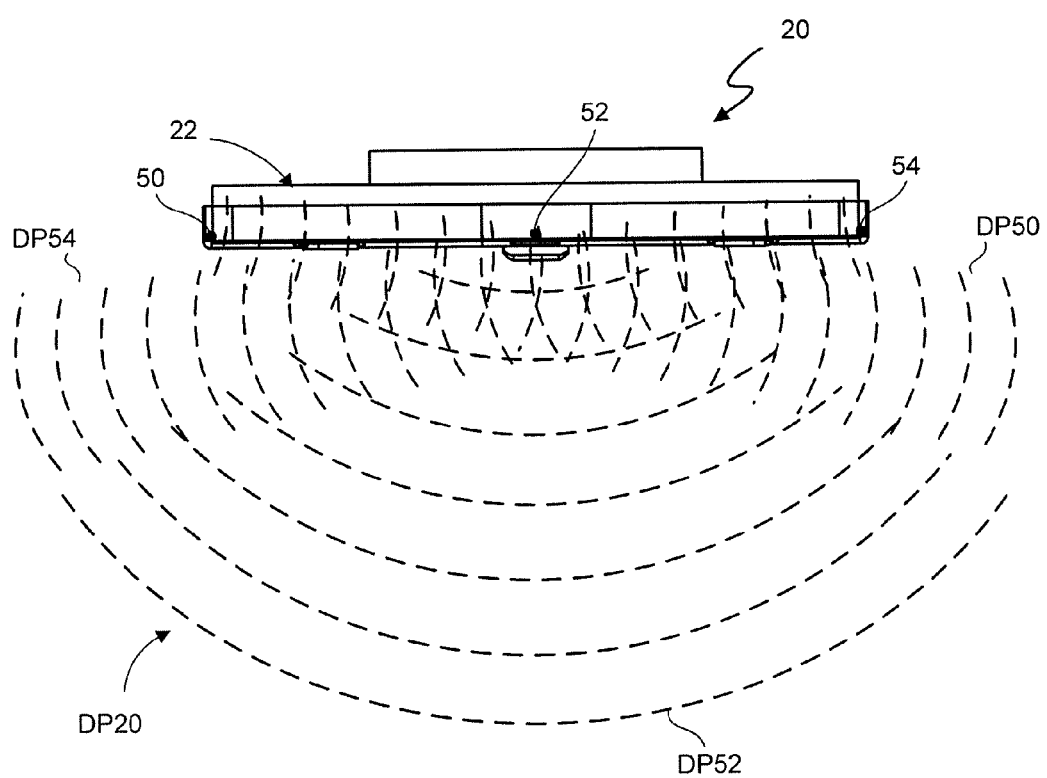
FIG. 3C is a top plan view of the interactive board showing the detection profiles for both the ultrasonic proximity sensors and the passive IR proximity sensor.

The orientation of proximity sensors 50, 52 and 54 shown in FIGS. 3A and 3B, allows the interactive input system 20 to detect the presence of an object such as for example, a user positioned proximate to the interactive board 22. FIG. 3C shows the overall detection profile DP20 of the interactive input system 20 which is the combination of detection profiles DP50, DP52, and DP54.

Figure 4:
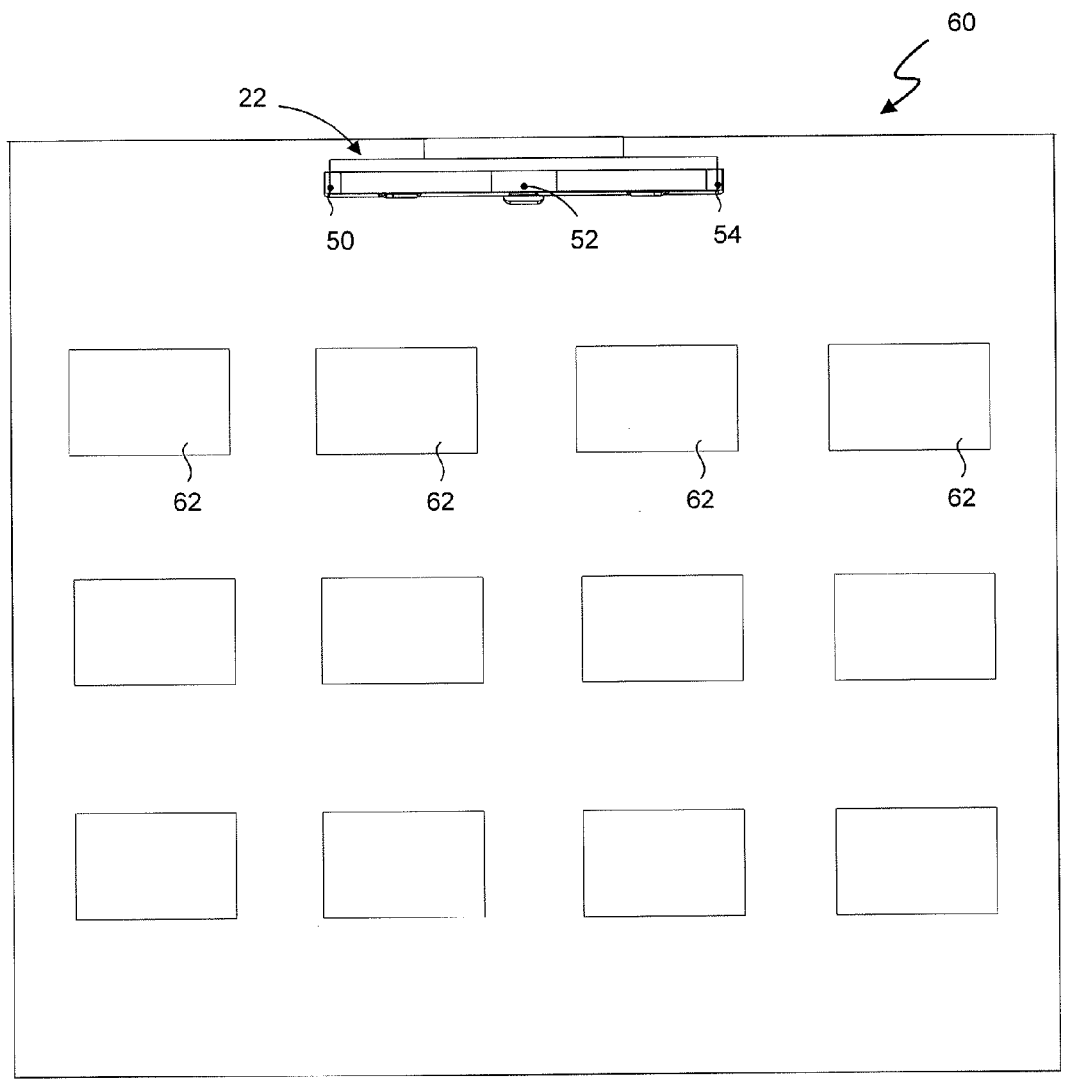
FIG. 4 is a top plan view of the interactive board installed in an operating environment.

As shown in FIG. 4, interactive board 22 may operate in an operating environment 60 in which one or more fixtures 62 are located. In this embodiment, the operating environment 60 is a classroom and fixtures 62 are desks, however, as will be understood, interactive board 22 may alternatively be used in other environments in which one or more other types of fixtures are located. Once interactive board 22 has been installed in the operating environment 60, the interactive board 22 is calibrated so as to allow proximity sensors 50, 52 and 54 to sense the presence of fixtures 62 in their respective detection ranges. Proximity sensors 50, 52 and 54 communicate calibration data to the master controller, which receives the calibration data output from each of the proximity sensors 50, 52 and 54 and stores the calibration data in memory as a set of individual baseline values.

Figure 5A:
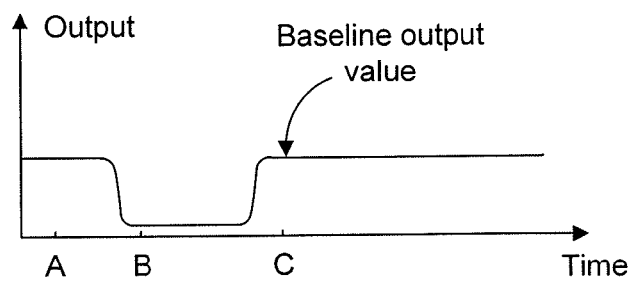
FIG. 5A is a graphical plot of exemplary output of one of the ultrasonic proximity sensors as a function of time.

FIG. 5A shows a graphical plot 70 of the typical output of one of the ultrasonic proximity sensors 50 and 54 over a period of time during which an object, such as a user, enters and exits the detection range of the ultrasonic proximity sensor. At times A and C, when the object is not within the detection range of the ultrasonic proximity sensor, the ultrasonic proximity sensor outputs the baseline value determined during calibration. At time B, when the object is within the detection range of the ultrasonic proximity sensor, the ultrasonic proximity sensor outputs a value differing from the baseline value and which represents the existence of the object as well as the distance between the ultrasonic proximity sensor and the object.

In general, acoustic noise and vibrational noise do not distort the output values of the ultrasonic proximity sensors due to the relatively high frequencies within which the ultrasonic proximity sensors operate. However, problems can arise when two ultrasonic proximity sensors have overlapping detection profiles as one of the ultrasonic proximity sensors may mistakenly read the echo created by the other of the ultrasonic proximity sensors causing an incorrect measurement to be reported. To remedy this problem, the ultrasonic proximity sensors 50 and 54 associated with the interactive input system 20 operate alternatively, that is, ultrasonic proximity sensor 50 only sends out a sound wave while ultrasonic proximity sensor 54 is quiet, and ultrasonic proximity sensor 54 only sends out a sound wave while ultrasonic proximity sensor 50 is quiet.

Figure 5B:
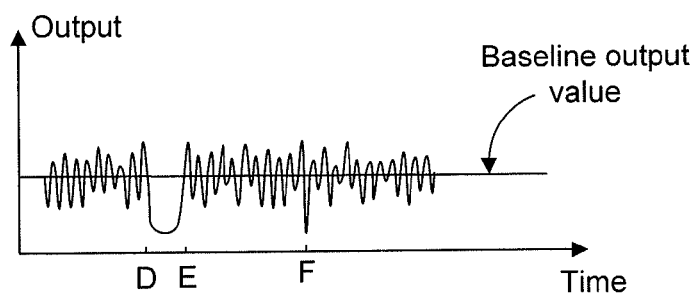
FIG. 5B is a graphical plot of exemplary output of one of the proximity sensors as a function of time distorted by noise.

As will be appreciated, in a practical operating environment, the outputs of the ultrasonic and passive IR proximity sensors 50, 52 and 54 are distorted by noise. FIG. 5B shows a graphical plot 74 of the typical output of one of the proximity sensors 50, 52, 54 over a period of time. The presence of noise may result in the proximity sensor generating an incorrect output value signifying the presence of an object such as for example a user when no object exists, and/or resulting in an incorrect calculation of an object's distance from the interactive board 22. To remedy potential problems caused by noise, the time duration of a signal differing from the baseline output value output by the proximity sensor is considered to determine if the change in output value is due to noise or due to the presence of an object. More specifically, the interactive input system 20 determines the presence of a user only if the proximity sensor outputs a value differing from the baseline output value for a threshold period of time. For example, as shown in FIG. 5B, the proximity sensor has output values that are significantly below the baseline output value between times D and E, and at time F. During processing, it is assumed that an object is present between times D and E, as the duration of time (time E–time D) during which the proximity sensor output is significantly below the baseline output value is greater than the threshold period of time. However, during time F, the proximity sensor output is only significantly below the baseline output value for a short duration less than the threshold period of time (time F) and thus, it is assumed that the low proximity sensor output value is due to the presence of noise, and is ignored.

Figure 5C:
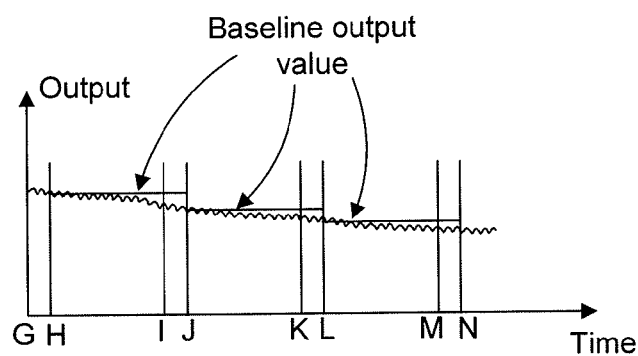
FIG. 5C is a graphical plot indicating the adjustment of the baseline output value as the output of the proximity sensor changes over time.

The output of the ultrasonic and passive IR proximity sensors 50, 52 and 54 also may drift over time due to changes in the operating environment 60. FIG. 5C shows a graphical plot 78 of the typical output of one of the proximity sensors 50, 52, 54 over a period of time. As can be seen, the baseline output value for the proximity sensor decreases over time. The change in the baseline output value may cause the proximity sensor to incorrectly detect the presence of an object such as for example a user, or may result in an incorrect calculation of an object's distance from the interactive board 22. To remedy potential problems caused by a decreasing baseline output value over time, the baseline output value is adjusted by averaging the baseline output value of the proximity sensor over a fixed period of time. For example, as shown in FIG. 5C, samples of the output baseline value are taken between times G and H and the average of the output baseline value between these times is calculated. The average output baseline value between times G and H is then used as the output baseline value for the time period between times H and J. Similarly, samples of the output baseline value are taken between times I and J, and the average of the output baseline value between these times is used as the output baseline value between times J and L. Again, samples of the output baseline value are taken between times K and L, and the average of the output baseline value between these times is used as the output baseline value between times L and N.

The master controller periodically acquires data from all proximity sensors 50, 52, and 54, and compares the acquired data to the baseline output values determined for each of the proximity sensors to detect the presence of objects such as a user in proximity with interactive board 22. General purpose computing device 28 stores this acquired data and comparison results in memory for future reference, if necessary. Also, the respective location of a user relative to the interactive board 22 may be determined by data output from the ultrasonic proximity sensors 50 and 54. Depending on the mode of operation of the interactive input system 20, the general purpose computing device 28 may use the data output by the proximity sensors 50, 52 and 54 to update LEDs 40 to 48 of the status indicator 38 to indicate the approximate position of a detected user relative to the interactive board 22, such as for example according to Table 1 below:

TABLE 1

| | HAS SENSOR DETECTED A USER? | | |
|---|---|---|---|
| | SENSOR 50 | SENSOR 52 | SENSOR 54 |
| LED 40 = ON | NO | NO | YES |
| LED 42 = ON | NO | YES | YES |
| LED 44 = ON | NO | YES | NO |
| LED 46 = ON | YES | YES | NO |
| LED 48 = ON | YES | NO | NO |

As an example, in the event ultrasonic proximity sensor 54 has detected the presence of a user, and proximity sensors 50 and 52 have not detected the presence of a user, it is determined that the user is positioned nearest the left hand side of the interactive board 22, and thus the left most LED of the status indicator 38 is powered ON, that is, LED 40. All other LEDs (LEDs 42, 44, 46 and 48) remain OFF. As another example, in the event ultrasonic proximity sensor 50 has detected the presence of a user, and proximity sensors 52 and 54 have not detected the presence of a user, it is determined that the user is positioned near the right hand side of the interactive board 22 and thus, only the right most LED of the status indicator 38 is powered ON, that is, LED 48.

Figure 6:
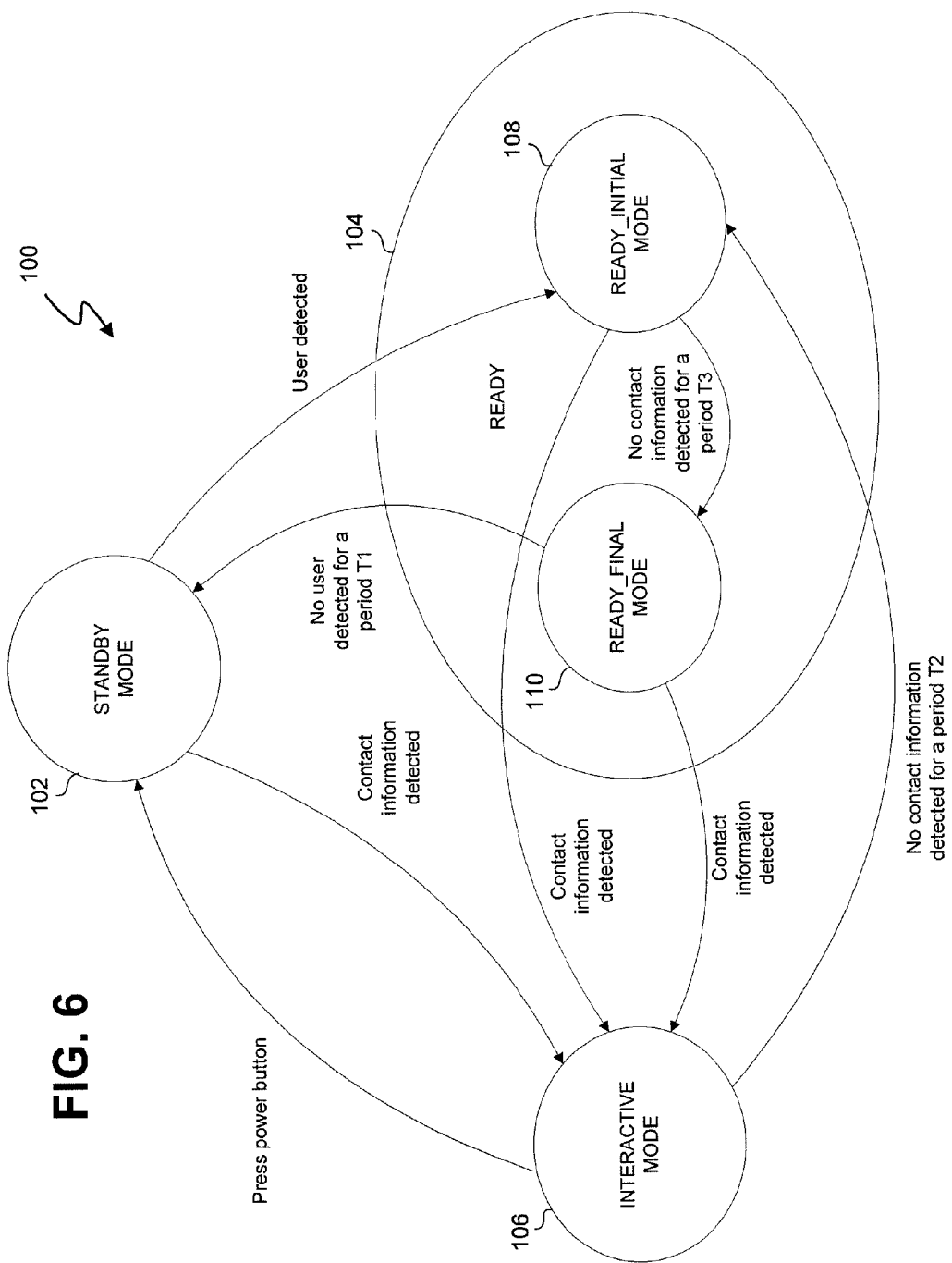
FIG. 6 is a state diagram showing three modes of operation of the interactive input system of FIG. 1.

As mentioned previously, the interactive input system 20 is operative in a plurality of modes, namely the standby mode 102, the ready mode 104 and the interactive mode 106 as schematically illustrated in state diagram 100 of FIG. 6. As can be seen, the ready mode 104 has two sub-modes, namely a ready_initial mode 108 and a ready_final mode 110. Each time the interactive input system 20 transitions to a new mode, a timer is reset within the general purpose computing device 28 to calculate potential time of inactivity.

Each mode will now be discussed, as well as the conditions under which the interactive input system 20 transitions between the various modes of operation.

The interactive input system 20 is transitioned to operate in the standby mode 102 in the event a power button associated with the interactive input system 20 has been pressed when the interactive input system 20 is operating in the interactive mode 106, or in the event no user is detected by the proximity sensors 50, 52 and 54 to be in proximity with the interactive board 22 for a threshold period of time $T_1$, such as for example ten (10) minutes, when the interactive input system 20 is operating in the ready_final mode 110.

Turning now to FIG. 7, the interactive board 22 is shown with the interactive input system 20 in the standby mode 102. As can be seen, while the interactive input system 20 operates in the standby mode 102, the general purpose computing device 28 is asleep and no image is presented on the interactive surface 24, and thus, it appears as if the LCD panel is powered OFF. The interactive board 22, keyboard (not shown) and mouse 32 are however monitored to determine if contact information has been received. The interactive input system 20 also monitors the proximity sensors 50, 52 and 54 to determine if a user is in proximity with the interactive board 22.

During the standby mode 102, LEDs 40, 42, 46 and 48 of the status indicator 38 are powered OFF. LED 44 is conditioned by the master controller to blink (transition between ON and OFF) at a slow frequency, such as for example every three (3) seconds, indicating to a user that the interactive input system 20 is operating in the standby mode 102.

Operation of the interactive input system 20 in the standby mode 102 is maintained until contact information has been received from the interactive board 22, keyboard (not shown) or mouse 32, in which case the interactive input system 20 is transitioned to the interactive mode 106, or in the event a user is detected to be in proximity with the interactive board 22, in which case the interactive input system 20 is transitioned to the ready_initial mode 108.

Referring back to FIG. 6, the interactive input system 20 operates in the ready mode 104 as a transition state between the standby mode 102 and the interactive mode 106, as will be described. During the ready mode 104, the interactive input system 20 is ready to transition immediately to the interactive mode 106 in response to contact information. As mentioned previously, the ready mode 104 comprises two sub-modes, namely the ready_initial mode 108 and the ready_final mode 110.

The interactive input system 20 is transitioned to operate in the ready_initial mode 108 in the event a user is detected to be in proximity with the interactive board 22 during operation in the standby mode 102, or in the event no contact information has been detected for a threshold period of time $T_2$, such as for example five (5) minutes, when the interactive input system 20 is operating in the interactive mode 106.

FIG. 8A illustrates the interactive board 22 with the interactive input system 20 in the ready_initial mode 108. During the ready_initial mode 108, the general purpose computing device 28 is awake and runs the host software application, in this example SMART Meeting Pro™. If no user has logged into the interactive input system 20, the host software application runs as a system process. Also, during the ready_initial mode 108, only a very dim image of the user interface of the host software application is presented on the interactive surface 24 to prevent a user from being disrupted by a sudden flash of light as the interactive input system 20 transitions from the standby mode 102 to the interactive mode 106. In this embodiment, the host software application makes use of the Credential Provider model provided by Microsoft™ Corporation to customize the Windows 7 login screen. The Credential Provider is run inside the system user account, and thus any applications that the Credential Provider spawns will also appear in the system user account.

During the ready_initial mode 108, LED 44 of the status indicator 38 is conditioned by the master controller to blink (transition between ON and OFF) at a high frequency (compared to the blinking frequency during the standby mode), such as for example every 0.5 seconds, indicating to a user that the interactive input system 20 is ready to be used. LEDs 40, 42, 46 and 48 of the status indicator 38 are activated by the master controller and used to indicate the approximate location of the user based on the output of the proximity sensors 50, 52, and 54, according to Table 1 above. As shown in FIG. 8A, since the user is positioned nearest the left hand side of the interactive board 22, LED 40 is powered ON, while LEDs 42, 46 and 48 remain OFF. To maintain indication of status to the user, LED 44 continues to blink at the high frequency.

During operation in the ready_initial mode 108, the interactive board 22, keyboard (not shown) and mouse 32 are monitored to determine if contact information has been received, in which case the interactive input system 20 is transitioned to the interactive mode 106, or in the event no contact information has been received for a threshold period of time $T_3$, such as for example five (5) minutes, in which case the interactive input system 20 is transitioned to the ready_final mode 110.

FIG. 8B illustrates the interactive board 22 with the interactive input system 20 in the ready_final mode 110. As can be seen, during the ready_final mode 110, the interactive input system 20 operates as it does during the ready_initial mode 108, with the addition of a system start indicator 70 being brightly displayed on the interactive surface 24. The system start indicator 70 is presented to prompt a user to touch the interactive surface 24 to begin using the interactive input system 20 in the interactive mode 106.

During the ready_final mode, LED 44 of the status indicator 38 continues to blink (transition between ON and OFF) at a high frequency (compared to the blinking frequency during the standby mode), such as for example every 0.5 seconds, indicating to a user that the interactive input system 20 is ready to be used. LEDs 40, 42, 46 and 48 of the status indicator 38 are used to indicate the approximate location of the user based on the output of the proximity sensors 50, 52, and 54, according to Table 1 above. As shown in FIG. 8B, since the user is positioned nearest the left hand side of the interactive board 22, LED 40 is powered ON, while LEDs 42, 46 and 48 remain OFF.

During operation in the ready_final mode 110, the interactive board 22, keyboard (not shown) and mouse 32 are monitored to determine if contact information has been received, in which case the interactive input system 20 is transitioned to the interactive mode 106, or in the event no user is detected to be in proximity with the interactive board 22 for the threshold period of time $T_1$, such as for example ten (10) minutes, in which case the interactive input system 20 is transitioned to the standby mode 102.

Referring back to FIG. 6, the interactive input system 20 is transitioned to operate in the interactive mode 106 in the event contact information has been received while operating in the standby mode 102, the ready_initial mode 108, or the ready_final mode 110.

FIG. 9 illustrates the interactive board 22 with the interactive input system 20 in the interactive mode 106. During the interactive mode 106, display content with which a user may interact is displayed on the interactive surface 24. In this embodiment, the graphic user interface (GUI) of SMART Meeting Pro™ software is displayed on the interactive surface 24, however in other embodiments the display content may include for example, a SMART Notebook™ page, a presentation slide, a document, and/or an image, and also may include one or more user interface (UI) components. The UI components are generally selectable by a user through pointer interaction with the interactive surface 24. The UI components may be for example, a menu bar, toolbars, toolboxes, icons, page thumbnail images etc.

During the interactive mode 106, LEDs 40, 42, 46 and 48 of the status indicator 38 are used to indicate the approximate location of the user based on the output of the proximity sensors 50, 52, and 54, according to Table 1 above. As shown in FIG. 9, since the user is positioned nearest the right hand side of the interactive board 22, LED 48 is powered ON, while LEDs 40, 42 and 46 remain OFF.

During operation in the interactive mode 106, the interactive board 22, keyboard (not shown) and mouse 32 are monitored to determine if no contact information has been detected for the threshold period of time $T_2$, such as for example five (5) minutes, in which case the interactive input system 20 is transitioned to the ready_initial mode 108, or in the event a power button associated with the interactive input system 20 has been pressed, in which case the interactive input system 20 is transitioned to the standby mode 102.

Figure 10A:
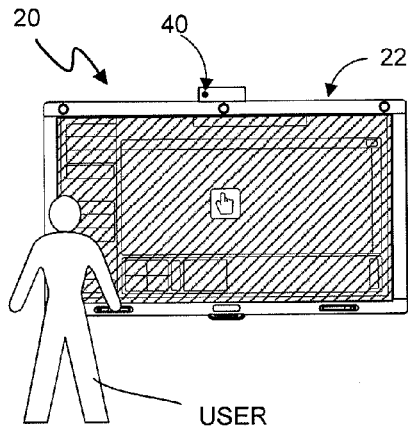
FIGS. 10A to 10D show the status indicator of FIG. 2 as a user moves with respect to the interactive board.
Figure 10B:
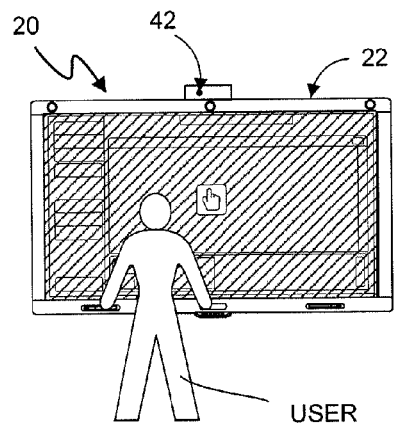
Figure 10C:
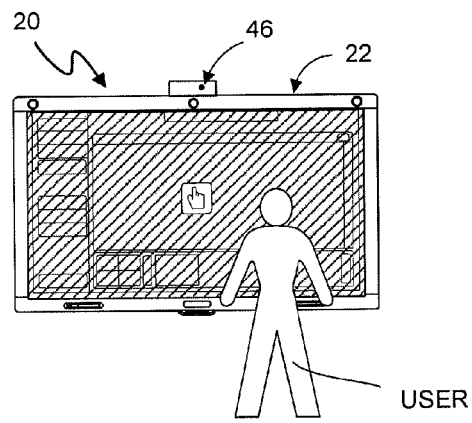
Figure 10D:
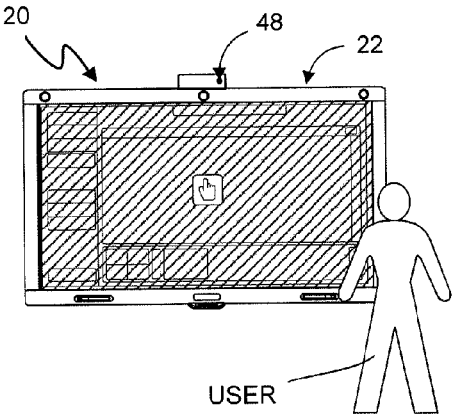

While the interactive input system 20 operates in the ready_initial mode 108, ready_final mode, 110 and interactive mode 106, the status indicator 38 is used to indicate the status of the interactive input system 20 as well as to indicate the approximate location of the user based on the output of the proximity sensors 50, 52 and 54, according to Table 1 above. In the event a user moves with respect to the interactive board 22, the status indicator 38 is updated to show the approximate position of the user. For example, as shown in FIG. 10A, the user is positioned nearest the left hand side of the interactive board 22, and thus, only LED 40 is powered ON. In the event the user moves across the interactive board 22, that is, closer to the center of the interactive board 22 as shown in FIG. 10B and indicated by arrow A, such that the user is positioned adjacent the left center of the interactive board 22, only LED 42 is powered ON. As the user continues to move across the interactive board 22 towards the right center of the interactive board, as shown in FIG. 10C and indicated by arrow A, only LED 46 is powered ON. Finally, when the user has moved to the right hand side of the interactive board 22, as shown in FIG. 10D, only LED 48 is powered ON.

Figure 11:
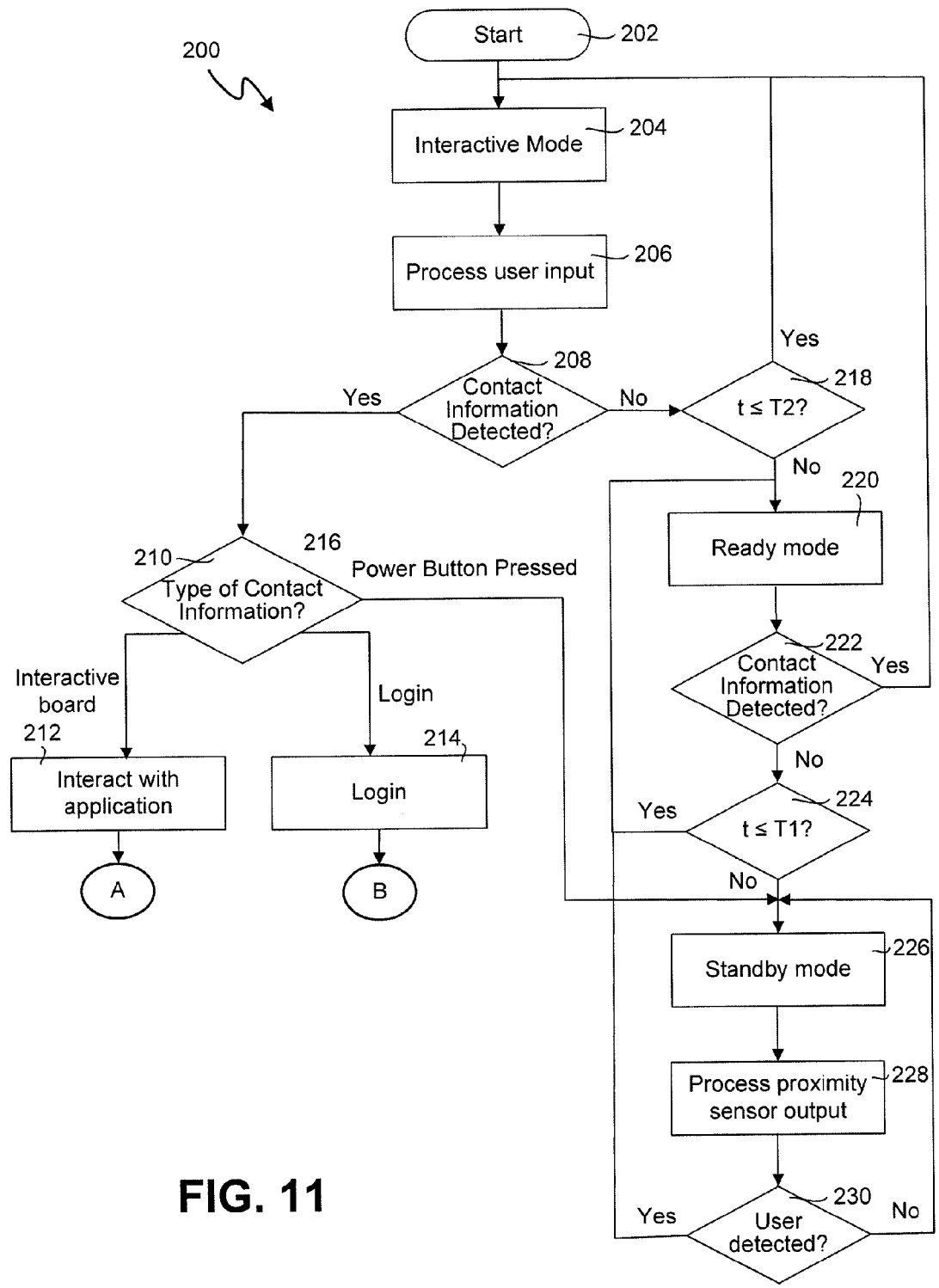
FIG. 11 is a flowchart showing a method of operating the interactive input system of FIG. 1.

FIG. 11 is a flow diagram illustrating the interactive input system 20 operating method 200 described above. As can be seen, the method 200 begins when the interactive input system 20 is turned ON (step 202). At this stage, the interactive input system 20 automatically begins operation in the interactive mode 106, wherein a timer is started by the general purpose computing device 28, the time of which is referred to as time "t" (step 204). Each time the interactive input system 20 transitions into a different mode, the timer is reset wherein time t is set equal to zero. The input sources such as the interactive board 22, the mouse 32, keyboard (not shown), and power button are monitored as described above to detect contact information (step 206).

In the event contact information is detected (step 208), the contact information is processed to determine the type of contact information (step 210). In the event that detected contact information is determined to be from the interactive board 22, keyboard (not shown) or mouse 32 (step 210), the user has the option to interact with the host software application without entering login information (step 212) or to login by entering login information (step 214). In the event that the detected contact information is determined to be from the power button (step 216), the mode of operation of the interactive input system 20 is switched to the standby mode (step 226).

In the event that no contact information is detected (step 208), time t is compared to the threshold period of time $T_2$ (step 218), and if time t is less than the threshold period of time $T_2$, the operation of the interactive input system 20 is maintained in the interactive mode 106 and the method returns to step 204. In the event time t is greater than the threshold period of time $T_2$ (step 218), the mode of operation of the interactive input system 20 is switched to the ready mode 104 (step 220).

During operation in the ready mode, the input sources such as the interactive board 22, the mouse 32, and the keyboard (not shown) are monitored as described above to detect contact information (step 222). In the event contact information is detected, the mode of operation of the interactive input system 20 is switched to the interactive mode 106, and the method returns to step 204. In the event no contact information is detected, the time t is compared to the threshold period of time $T_1$ (step 224), and if time t is less than the threshold period of time $T_1$, the operation of the interactive input system 20 is maintained in the ready mode 104 and the method returns to step 220. In the event time t is greater than the threshold period of time $T_1$ (step 224), the mode of operation of the interactive input system 20 is switched to the standby mode 102 (step 226).

During operation in the standby mode 102, the proximity sensors 50, 52 and 54 are monitored and output signals received therefrom are processed (step 228) to determine the presence of a user (step 230). If no user is detected, the operation of the interactive input system 20 is maintained in the standby mode 102 and the method returns to step 226. If a user is detected, the mode of operation of the interactive input system 20 is switched to the ready mode 104 (step 220).

Figure 12:
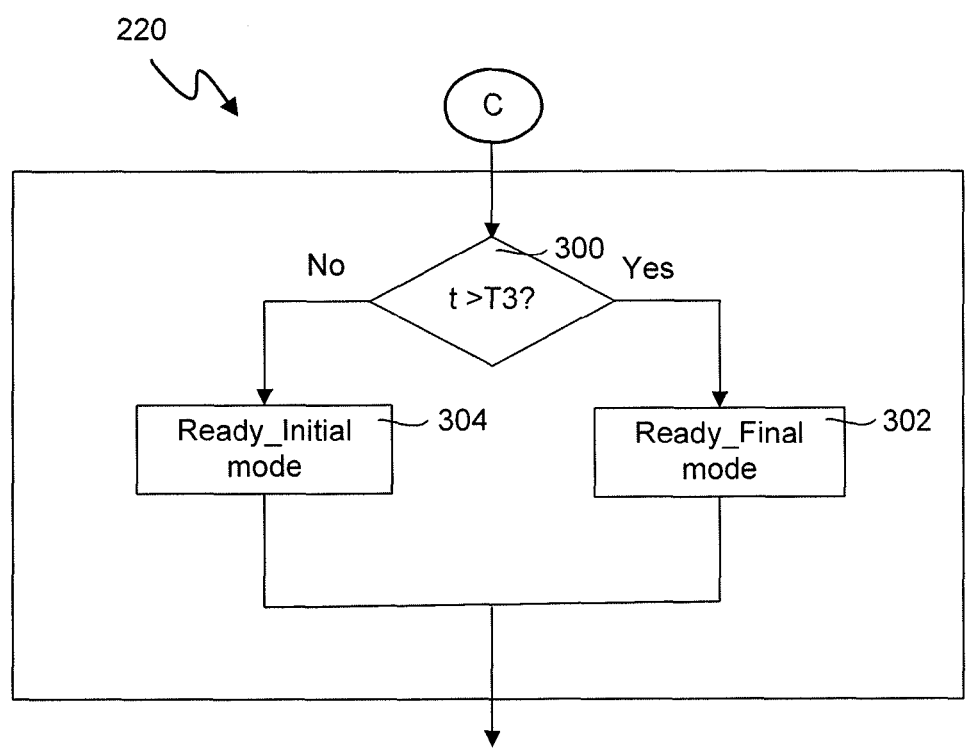
FIG. 12 is a flowchart showing a method of operating the interactive input system of FIG. 1 in the ready mode.

FIG. 12 is a flow diagram further illustrating step 220 of method 200. Once the interactive input system 20 begins operation in the ready mode 104, the time t is compared to the threshold period of time $T_3$ (step 300). If the time t is greater than the threshold period of time $T_3$, the interactive input system 20 operates in the ready_final mode 110 (step 302). If time t is less than or equal to the threshold period of time $T_3$, the interactive input system 20 operates in the ready_initial mode 108 (step 304).

Figure 13:
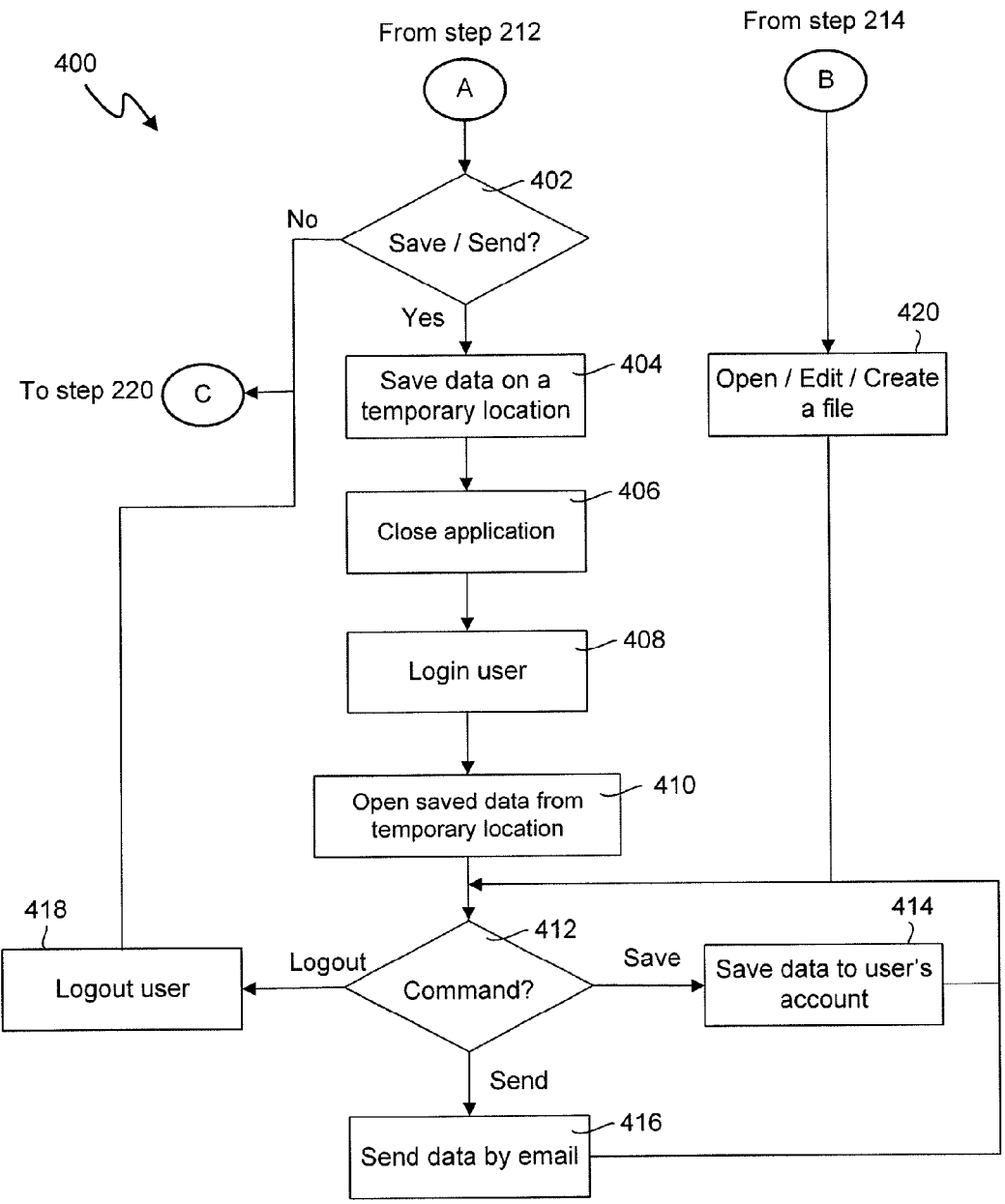
FIG. 13 is a flowchart showing steps for interacting with a host software application with and without logging in to a user's account.

FIG. 13 is a flow diagram further illustrating steps 212 and 214 of method 200. Once contact information has been detected and determined to be from the interactive board 22, keyboard (not shown) or mouse 32, the user has an option to interact with the host software application without entering login information (step 212) or to login by entering login information (step 214). If the user decides to continue use without entering login information (step 212), at the end of the user's interactive board session, the user is presented with an option either to send the session data through email, save the session data in a user account, or not save the session data (step 402). If the user decides not to save the session data, the mode of operation of the interactive input system 20 is switched to the ready mode 104 (step 220 as shown in FIG. 11). If the user decides to save the session data, the session data is saved into a temporary location within the memory of the general purpose computing device 28 (step 404), and the interactive board session is closed (step 406). The user is then prompted to enter login information (step 408) and the session data is retrieved from the temporary location within the memory of the general purpose computing device 28 and displayed for the user (step 410). The user is then prompted to save the session data, send the session data by email, or to logout (step 412). If the user opts to save the session data, the session data is saved on a memory accessible by the user's account (step 414) and the method returns to step 412. If the user opts to send session data by email (step 416), the user is prompted to enter a list of recipients and the session data is sent by email and the method returns to step 412. If the user chooses to logout (step 418), the mode of operation of the interactive input system 20 is switched to the ready mode 104 (step 220 as shown in FIG. 11).

If the user decides to interact with the host software application by entering login information (step 214), after the user enters their login information, the host software application prompts the user to open/edit/create a file (step 420) and at the end of the user's interactive board session, the user is prompted to save the session data, send the session data by email, or to logout (step 412) as described above.

Although it is described that when the interactive input system 20 operates in the ready mode, a host software application is running, those skilled in the art will appreciate that alternatives are available. For example, during the ready mode no host software application needs to be running. In this case, in the event the interactive input system 20 transitions from the ready mode 104 to the interactive mode 106, the user will be prompted to enter login information.

As will be appreciated, the threshold periods of time $T_1$, $T_2$ and $T_3$ may be adjusted by a user to fit their operating needs. For example, the threshold periods of time may be set using a screen saver setting dialog box as commonly used in the Windows operating system.

Although the interactive input system is described as utilizing an LCD panel for displaying the images, those skilled in the art will appreciate that other types of interactive input systems may be used. For example, an interactive input system that utilizes a boom assembly to support a short-throw projector such as that sold by SMART Technologies ULC of Calgary, Alberta under the name "SMART UX60", which projects an image, such as for example, a computer desktop, onto the interactive surface, may be used.

In another embodiment, information determined from proximity sensor output regarding the distance of the user from the interactive board 22 is used to transition the interactive input system 20 from the standby mode to the ready mode. In this embodiment, the interactive input system 20 does not automatically transition from the standby mode to the ready mode upon detection of a user in proximity with the interactive board 22. Rather, the position of the user with respect to the interactive board 22 is calculated based on the output of the ultrasonic proximity sensors 50, 54 and in the event the position of the user is determined to be within a threshold distance of the interactive board 22, the interactive input system 20 transitions to the ready mode. In another embodiment, in the event a user is determined to be proximate to the interactive board 22, the interactive input system 20 may start a timer, and if the user remains in proximity with the interactive board 22 for a time greater than a threshold period of time, the interactive input system will transition from the standby mode to the ready mode. This operation allows the interactive input system 20 to ignore people passing by the interactive board 22 who do not intend to use the interactive input system 20.

In another embodiment, the ready mode may be disabled by the user as required. This is particularly useful in projector-based systems as the life of a projector bulb is reduced by frequently turning on the projector. In this embodiment, the user will be required to turn on the interactive input system 20 by pressing a button to make sure the interactive input system is only turned on when the user actually wants to use it.

Figure 14:
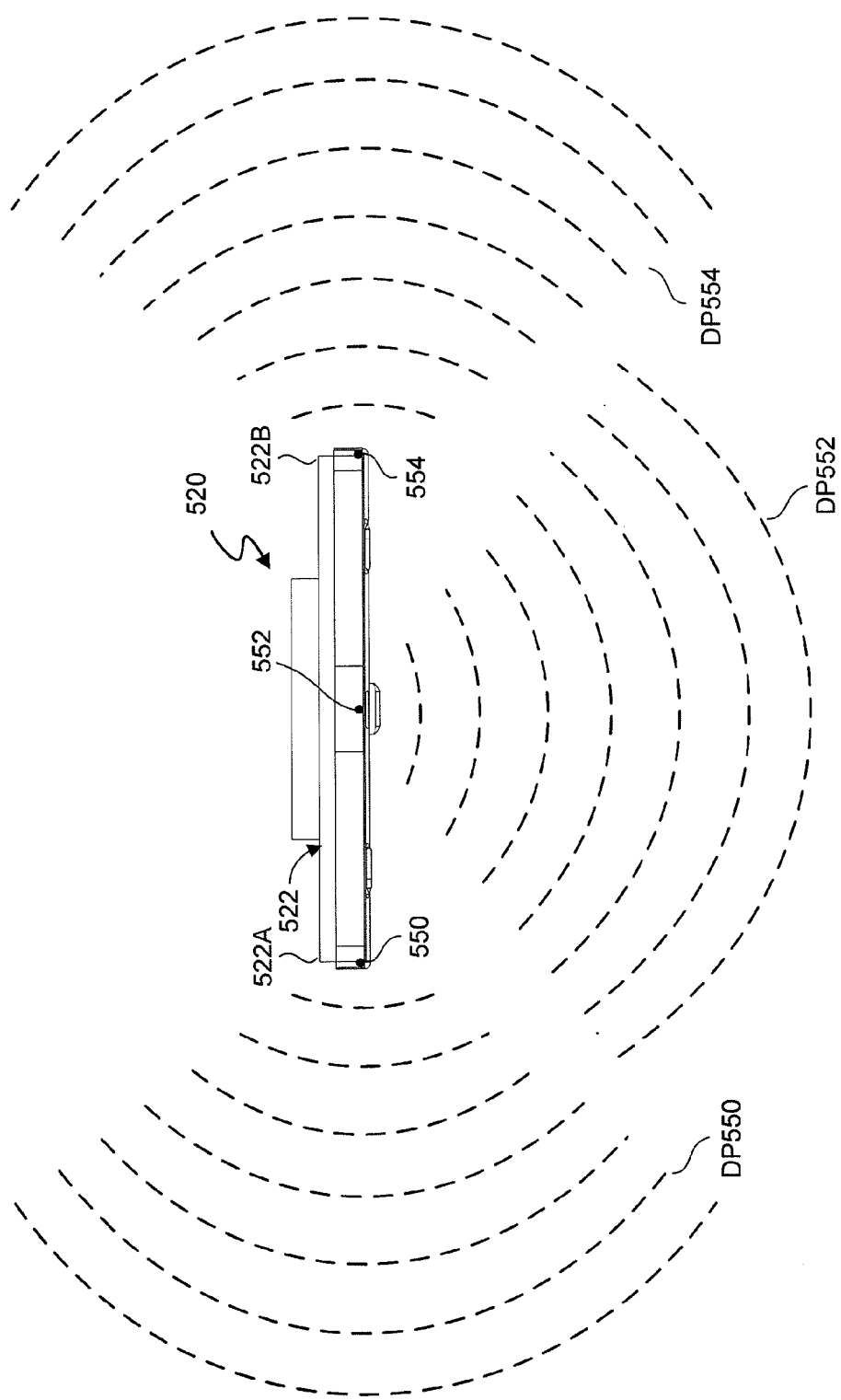
FIG. 14 is a top plan view of another embodiment of an interactive board, showing the detection profile thereof.

Turning now to FIG. 14, another embodiment of an interactive board 522 is shown. In this embodiment, like reference numerals will be used to indicate like components of the previous embodiment with a "500" added for clarity. As can be seen, interactive board 522 is similar to that of interactive board 22, and comprises three (3) proximity sensors 550, 552 and 554 mounted on the top portion of bezel 526. In this embodiment, proximity sensors 550 and 554 are positioned near corners 522A and 522B, respectively and proximity sensor 552 is positioned intermediate proximity sensors 550 and 554 at a point generally midway between corners 522A and 522B, respectively.

In this embodiment, each of the proximity sensors 550, 552 and 554 is a passive IR proximity sensor, such as that manufactured by Panasonic Electric Works under the part number EKMC 1601112. Each of the proximity sensors 550, 552 and 554 has a detection angle of approximately 94 degrees and has a detection range of approximately 5 meters.

Proximity sensor 550 is positioned within the top portion of bezel 526 and angled such that its detection profile DP550 is directed generally outward from one side of the interactive board 522, so as to provide coverage of that side of the interactive board 522. Proximity sensor 554 is positioned within the top portion of bezel 526 and angled such that its detection profile DP552 is directed generally outward from the other side of the interactive board 522, opposite that of proximity sensor 550, so as to provide coverage of that side of the interactive board 522. Proximity sensor 552 is positioned within the top portion of bezel 526 and angled such that its detection profile DP552 is directed generally outward from the interactive board 522. In this embodiment proximity sensors 550, 552 and 554 are configured to detect the presence of an object within their respective detection ranges, but do not calculate the distance between themselves and the objects they detect.

The orientation of proximity sensors 550, 552 and 554 allows the interactive input system 520 to detect the presence of an object such as for example a user positioned proximate the interactive board 522 regardless of whether the user is positioned in front of, to the side of, or to the side and behind the interactive board 522. As will be appreciated, should the interactive input system 520 be positioned in a room having a door, the orientation of proximity sensors 550 and 554 allows the interactive input system 520 to detect the presence of a user entering the room, particularly in rooms where the interactive board 522 is installed on a wall adjacent to the door.

Although the above-mentioned embodiments describe various configurations and types of proximity sensors, those skilled in the art will appreciate that other types of proximity sensors may be used. For example, sonar-based, infrared (IR) optical-based, and CMOS or CCD image sensor-based proximity sensors, and combinations thereof, may be used. Further, in embodiments where at least one IR proximity sensor is used, a threshold may be applied. The threshold value for detecting a user may be selected based on the operating environment such as for example 80% below the baseline output value of the sensor.

Figure 15:
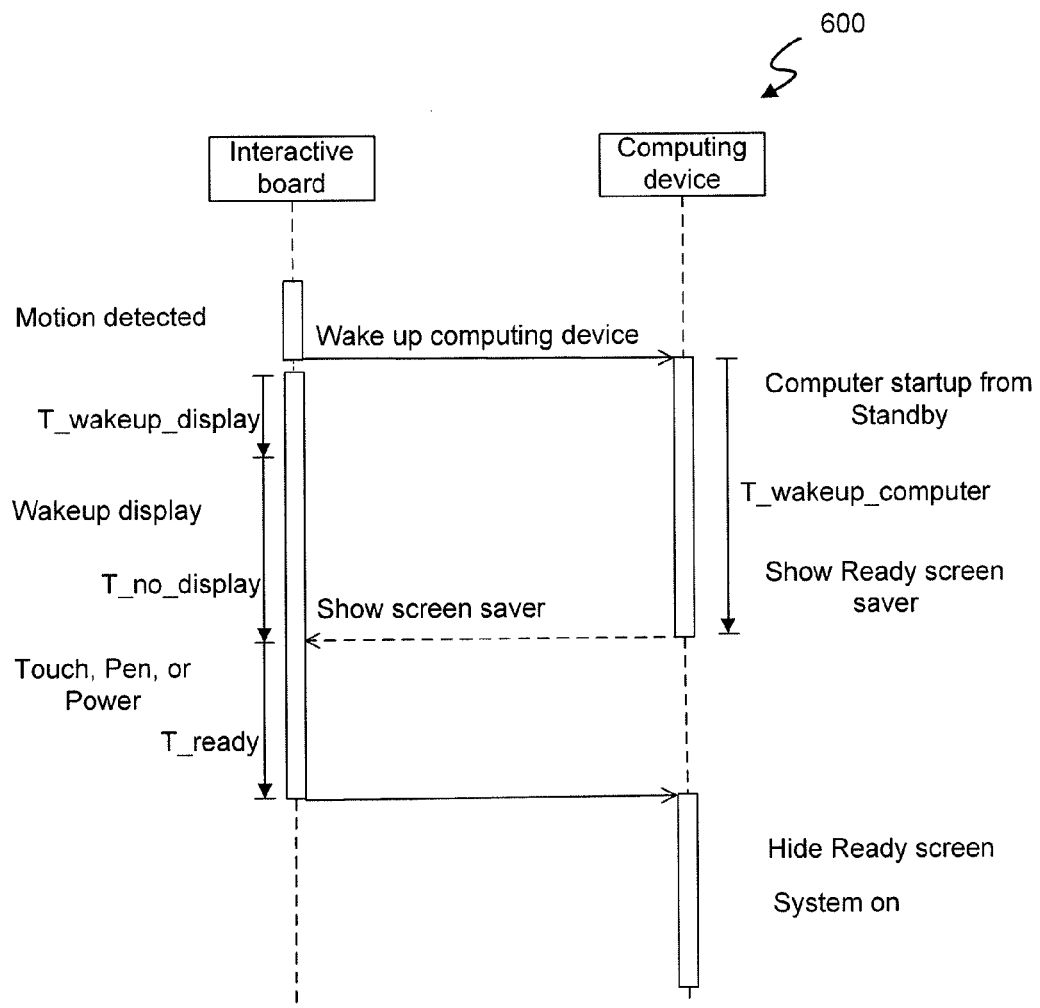
FIG. 15 is a unified modeling language (UML) sequence diagram showing the sequence of operations to transition the interactive input system from the ready mode to the interactive mode according to another embodiment.

Although the interactive input system is described as transitioning to and from the ready mode based on threshold periods of time, those skilled in the art will appreciate that the interactive input system may transition to and from the ready mode based on other criteria. For example, in another embodiment, the ready mode described above may be implemented based on software criteria utilizing screen saver modes from the general purpose computing device 28, as shown in FIG. 15, which illustrates a unified modeling language (UML) sequence diagram generally identified by reference numeral 600. In this case, while the interactive input system 20 operates in the standby mode, the output signals of the proximity sensors are monitored and processed to determine the presence of a user. If a user is detected, the mode of operation of the interactive input system 20 is switched to the ready mode, wherein the general purpose computing device 28 wakes up from operating in the standby mode. The general purpose computing device 28 requires time $T_{wakeup.computer}$ to transition from the standby mode to the ready mode. At basically the same time, the mode of operation of the interactive board 22 transitions from operation in the standby mode to the ready mode. The interactive board 22 requires time $T_{wakeup.display}$ to transition from the standby mode to the ready mode. As will be appreciated, $T_{wakeup.display}$ is less than $T_{wakeup.computer}$. As such, the interactive board 22 operates in the ready mode prior to the general purpose computing device 28, and thus operates for a period of time $T_{no.display}$ (calculated as the difference between $T_{wakeup.display}$ and $T_{wakeup.computer}$) wherein no input is received from the general purpose computing device 28. Once the general purpose computing device 28 transitions to the ready mode, the general purpose computing device 28 outputs a screen saver that is displayed on the interactive surface 24 of the interactive board 22. In this embodiment, the screen saver is configured to be a start indicator prompting a user to touch the interactive surface 24 to begin using the interactive input system 20 in the interactive mode. The interactive board 22, keyboard (not shown) and mouse 32 are monitored for time $T_{ready}$, to determine if contact information has been received, in which case the mode of the interactive input system 20 is transitioned to the interactive mode. Once contact information has been received, the screen saver is no longer displayed on the interactive surface 24 and the interactive input system 20 operates in the interactive mode as described above. In this embodiment, the ready mode screen (screen saver) is only displayed when the general purpose computing device 28 is ready to receive input.

Figure 16:
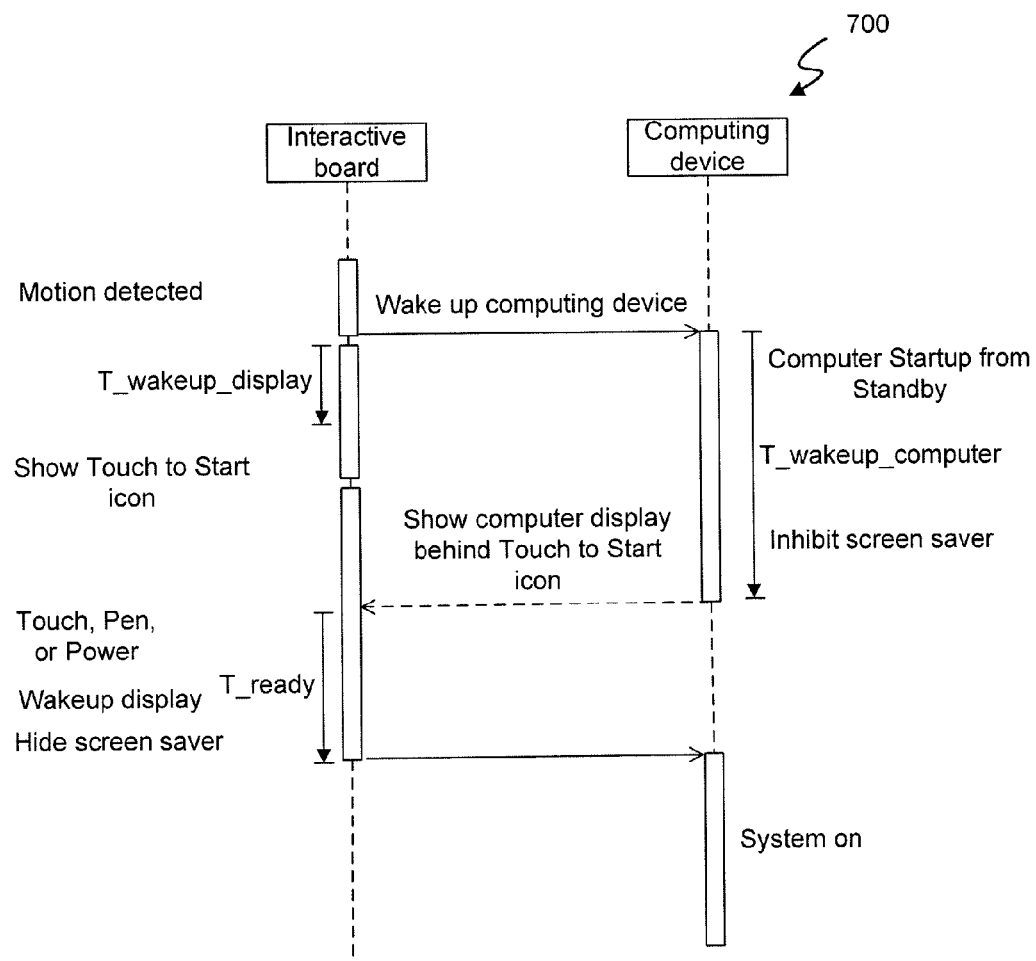
FIG. 16 is a UML sequence diagram showing the sequence of operations to transition the interactive input system from the ready mode to the interactive mode according to yet another embodiment.

As another example, the ready mode described above may be implemented separately for the interactive board 22 and the general purpose computing device 28. In this embodiment, hardware associated with the interactive board 22 controls the ready mode operations of the interactive board and software, such as for example an operating system, running on the general purpose computing device 28 controls the ready mode operations of the general purpose computing device. This embodiment is shown in FIG. 16 as a UML sequence diagram generally identified by reference numeral 700. In this case, while the interactive input system 20 operates in the standby mode, the output signals of the proximity sensors are monitored and processed to determine the presence of a user. If a user is detected, the mode of operation of the interactive input system 20 is switched to the ready mode, wherein the general purpose computing device 28 wakes up from operating in the standby mode. The general purpose computing device 28 requires time $T_{wakeup.computer}$ to transition from the standby mode to the ready mode. At basically the same time, the mode of operation of the interactive board 22 transitions from the operation in the standby mode to the ready mode. The interactive board 22 requires time $T_{wakeup.display}$ to transition from the standby mode to the ready mode. As will be appreciated, $T_{wakeup.display}$ is less than $T_{wakeup.computer}$. As such, the interactive board 22 operates in the ready mode prior to the general purpose computing device 28, and displays a translucent "touch to start" icon on the interactive surface 24 that is received from internal hardware within the interactive board 22. Once the general purpose computing device 28 is set to the ready mode (that is, it is turned on), the screen saver is not output by the general purpose computing device 28 to the interactive board 22. Rather, a dim image of a user interface associated with a software application running on the computing device 28 is presented on the interactive surface 24 behind the translucent "touch to start" icon. The interactive surface 24 continues to display the "touch to start" icon received from the internal hardware of the interactive board 22 with the dim image of the user interface presented behind the translucent "touch to start" icon. The interactive board 22, keyboard (not shown) and mouse 32 are monitored for time $T_{ready}$ to determine if contact information has been received, in which case the mode of the interactive input system 20 transitions to the interactive mode. Once contact information has been received, the "touch to start" icon is no longer displayed on the interactive surface 24 and the interactive input system 20 operates in the interactive mode as described above. In this embodiment, the ready mode screen ("touch to start" icon) is displayed once the interactive board 22 operates in the ready mode, which as described above, is before the general purpose computing device 28 operates in the ready mode.

As will be appreciated, the embodiments described above with reference to FIGS. 15 and 16 include both sub-modes of the ready mode, that is, the ready_initial mode and the ready_final mode.

Although it is described above that the output of the proximity sensors is used to control the operation of the interactive input system, those skilled in the art will appreciate that the output of the proximity sensors may be used to control the operation of additional peripheral devices utilized by the interactive input system 20. For example, in another embodiment, the interactive input system may utilize two (2) video cameras installed adjacent opposing sides of a meeting room. In this embodiment, one of the video cameras captures video of participants in the meeting and the other video camera captures video of a presenter positioned adjacent to the interactive board 22. The video captured by these video cameras may be viewed remotely by participants not located within the meeting room. Timely switching between the video output from the two video cameras broadcast to remote locations is performed using the output from the proximity sensors. For example, when the proximity sensors detect a presenter adjacent to the interactive board, the video output from the video camera capturing video of the presenter positioned adjacent to the interactive board is provided to the remote users. When the presenter moves out of range of the proximity sensors, the video output from the video camera capturing video of participants in the meeting is provided to the remote users.

In another embodiment, the interactive input system has user identification capabilities to determine if an identified user is registered in a database and thus has permission to use the interactive input system. For example, the interactive input system may have facial recognition capabilities. In this embodiment, when a user is detected to be in proximity with the interactive board, the interactive input system performs facial recognition. The image data comprising information of the recognized user is compared to a database to determine if the user is registered. If the user is registered, the mode of operation of the interactive input system transitions from the ready mode to the interactive mode. If the user is not registered, the mode of operation of the interactive input system remains in the ready mode. As will be appreciated, other known methods of identifying a user may be used such as for example voice recognition, retinal scanning, finger print scanning, etc.

Although a solution to address the drifting problem associated with the proximity sensors is described as averaging baseline output values over a period of time, those skilled in the art will appreciate that other known techniques to address drifting problems associated with proximity sensors may be used.

Although the proximity sensors are described as being positioned along the top portion of the bezel surrounding the interactive surface, those skilled in the art that the proximity sensors may be positioned at other locations. For example, the proximity sensors may be positioned along the bottom portion of the bezel, or may be placed at positions all around the bezel to enable the presence and position of a user to be more accurately determined. In another embodiment, the proximity sensors may be positioned at other locations within the operating environment of the interactive input system to detect the presence, orientation and movement of potential users. Further, any suitable number of proximity sensors may be used.

Although the status indicator is described as utilizing a series of five (5) LEDs, those skilled in the art will appreciate that any suitable number or type of indicators may be used. For example, four (4) LEDs may be used to indicate the approximate position of a user, and separately, three (3) separate LEDs may be provided to indicate the status of the interactive input system, each of the three (3) LEDs corresponding to one of the standby mode, the ready mode, and the interactive mode.

In another embodiment, the status indicator is in the form of an LCD panel. In this embodiment, the LCD panel is used to display the operational mode and position of the user, and may further be used to display messages such as for example instructions, informing potential users that the interactive input system is in the ready mode and instructing the potential users how to transition the interactive input system from the ready mode to the interactive mode.

Although it is described that in the event there is no contact information for a threshold period of time $T_2$ when the interactive input system is operating in the interactive mode, the operational mode of the interactive input system is transitioned to the ready_initial, those skilled in the art will appreciate the operational mode of the interactive input system may alternatively transition to the ready_final or the standby mode.

Those of skill in the art will also appreciate that the proximity sensors and operating mode methodologies described above are not limited to use in an interactive input system that employs machine vision. The proximity sensors and operating mode methodologies may of course be employed in interactive input systems that employ alternative structure to detect pointer interaction with an interactive surface.

Although embodiments have been described with reference to the drawings, those of skill in the art will appreciate that variations and modifications may be made without departing from the scope thereof as defined by the appended claims.

What is claimed is:

1. An interactive input system comprising:
an interactive surface;
at least one proximity sensor mounted along a bezel surrounding the interactive surface and configured to generate output signifying presence of one or more users in proximity to the interactive surface; and
processing structure configured to process user input generated in response to user interaction with said interactive input system and output from the at least one proximity sensor signifying the presence of one or more users in proximity to the interactive surface and to control interactive input system operation based upon said user input and proximity sensor output,
wherein said interactive input system is operable in an interactive mode, a ready mode, and a standby mode,
wherein when the interactive input system is operating in either the ready mode or the standby mode, the processing structure is configured to condition said interactive input system to operate in said interactive mode in response to user input generated at least in response to user interaction with said interactive surface,
wherein when the interactive input system is operating in the standby mode, the processing structure is configured to condition said interactive input system to operate in said ready mode in response to proximity sensor output that signifies the presence of one or more users in proximity to the interactive surface, and
wherein during operation in the ready mode, the processing structure is configured to condition the interactive input system to display a status indicator prompting the user to interact with the interactive surface to begin using the interactive input system in the interactive mode.

2. The interactive input system of claim 1 wherein said user input is further generated in response to user interaction with at least one input device in communication with said processing structure.

3. The interactive input system of claim 2 wherein said at least one input device comprises at least one of a keyboard and a mouse.

4. The interactive input system of claim 1 wherein the ready mode comprises a plurality of sub-modes.

5. The interactive input system of claim 1 wherein when the interactive input system is operating in the ready mode and the at least one proximity sensor has not generated output that signifies the presence of one or more users in proximity to the interactive surface for a period of time exceeding a threshold period of time, the processing structure is configured to condition said interactive input system to operate in said standby mode.

6. The interactive input system of claim 4 wherein said ready mode comprises a ready_initial sub-mode and a ready_final sub-mode and wherein when the interactive input system is operating in the standby mode, the processing structure, in response to proximity sensor output that signifies the presence of one or more users in proximity to the interactive surface, is configured to condition said interactive input system to operate in the ready_initial sub-mode.

7. The interactive input system of claim 6 wherein in absence of user input for a period of time exceeding a first threshold period of time when the interactive input system is operating in the ready_initial sub-mode, the processing structure is configured to condition said interactive input system to operate in the ready_final sub-mode.

8. The interactive input system of claim 7 wherein when the interactive input system is operating in the ready_final sub-mode and the at least one proximity sensor has not generated output that signifies the presence of one or more users in proximity to the interactive surface for a period of time exceeding a second threshold period of time, the processing structure is configured to condition said interactive input system to operate in said standby mode.

9. The interactive input system of claim 1 wherein when the interactive input system is operating in the interactive mode, the processing structure, in response to actuation of an interactive input system power button, is configured to condition said interactive input system to operate in the standby mode.

10. The interactive input system of claim 1 wherein the at least one proximity sensor comprises a plurality of proximity sensors.

11. The interactive input system of claim 10 wherein at least one of the proximity sensors is configured to detect a user positioned in front of the interactive surface.

12. The interactive input system of claim 11 wherein other proximity sensors are configured to detect a user positioned adjacent a side of the interactive surface.

13. The interactive input system of claim 10 wherein each of the proximity sensors is configured to detect a user positioned in front of the interactive surface.

14. The interactive input system of claim 10 wherein said proximity sensors are positioned at spaced locations about said interactive surface.

15. The interactive input system of claim 14 wherein said proximity sensors are mounted on a bezel that at least partially surrounds said interactive surface.

16. The interactive input system of claim 15 wherein at least two proximity sensors are positioned adjacent opposite sides of said interactive surface and wherein at least one proximity sensor is positioned adjacent the middle of said interactive surface.

17. The interactive input system of claim 16 wherein said at least two proximity sensors and said at least one proximity sensor are arranged in a line along the same side of said interactive surface.

18. The interactive input system of claim 10 wherein said proximity sensors are selected from the group consisting of ultrasonic proximity sensors and infrared proximity sensors.

19. The interactive input system of claim 1 further comprising a status indicator for indicating the approximate position of a user in proximity to the interactive surface.

20. The interactive input system of claim 19 wherein the status indicator further indicates the interactive input system operational mode.

21. The interactive input system of claim 19 wherein the status indicator comprises a plurality of illumination sources.

22. A method of operating an interactive input system comprising:
receiving user input generated at least in response to user interaction with an interactive surface surrounded by a bezel having at least one proximity sensor;
receiving sensor output from the at least one proximity sensor in response to presence of one or more users in proximity to said interactive surface; and processing said user input and said sensor output to determine an operating mode of the interactive input system, wherein the operating mode is one of an interactive mode, a ready mode, and a standby mode, and wherein said processing comprises:
when the interactive input system is operating in either the ready mode or the standby mode, in response to said received user input, conditioning the interactive input system to operate in said interactive mode;
when the interactive input system is operating in the standby mode, in response to sensor output, conditioning the interactive input system to operate in said ready mode; and
when the interactive input system is operating in the ready mode, conditioning the interactive input system to display a status indicator prompting the user to interact with the interactive surface to begin using the interactive input system in the interactive mode.

23. The interactive input system of claim 1 wherein when the interactive input system is operating in the interactive mode, in the absence of user input for a threshold period of time, the processing structure is configured to condition said interactive input system to operate in said ready mode.

24. The interactive input system of claim 8 wherein when the interactive input system is operating in the interactive mode, in the absence of user input for a third threshold period of time, the processing structure is configured to condition said interactive input system to operate in said ready_initial sub-mode.

25. The interactive input system of claim 1 wherein when the interactive input system is operating in said standby mode, no image is presented on said interactive surface.

26. The interactive input system of claim 24 wherein when the interactive input system is operating in said standby mode, no image is presented on said interactive surface.

27. The interactive input system of claim 26 wherein when the interactive input system is operating in said ready_initial sub-mode, a dim user interface is presented on said interactive surface.

28. The interactive input system of claim 27 wherein when the interactive input system is operating in said ready_final sub-mode, the status indicator is brightly presented on said interactive surface.

29. An interactive input system comprising:
an interactive surface;
at least one proximity sensor adjacent the interactive surface; and
at least one processor configured to process user input generated in response to user interaction with said interactive surface, to process output from the at least one proximity sensor generated in response to one or more users being in proximity to said interactive surface, and in response to determine an operating mode of said interactive input system,
wherein said interactive input system is operable in an interactive mode, a ready mode, and a standby mode,
wherein when the interactive input system is operating in either the ready mode or the standby mode, the processor is configured to condition said interactive input system to operate in said interactive mode in response to user input generated at least in response to user interaction with said interactive surface,
wherein when the interactive input system is operating in the standby mode, the processor is configured to condition said interactive input system to operate in said ready mode in response to proximity sensor output,
wherein when the interactive input system is operating in the ready mode and the at least one proximity sensor has not generated output that signifies one or more users being in proximity to the interactive surface for a period of time exceeding a first threshold period of time, the processor is configured to condition said interactive input system to operate in said standby mode, and
wherein during operation in the ready mode, the processing structure is configured to condition the interactive input system to display a status indicator prompting the user to interact with the interactive surface to begin using the interactive input system in the interactive mode.

30. The interactive input system of claim 29 wherein said ready mode comprises a ready_initial sub-mode and a ready_final sub-mode and wherein when the interactive input system is operating in the standby mode, the processing structure, in response to proximity sensor output that signifies one or more users being in proximity to the interactive surface, is configured to condition said interactive input system to operate in the ready_initial sub-mode.

31. The interactive input system of claim 30 wherein in absence of user input for a period of time exceeding a second threshold period of time when the interactive input system is operating in the ready_initial sub-mode, the processing structure is configured to condition said interactive input system to operate in the ready_final sub-mode.

32. The interactive input system of claim 31 wherein when the interactive input system is operating in the ready_final sub-mode and the at least one proximity sensor has not generated output that signifies one or more users being in proximity to the interactive surface for a period of time exceeding the first threshold period of time, the processing structure is configured to condition said interactive input system to operate in said standby mode.

33. The interactive input system of claim 32 wherein when the interactive input system is operating in the interactive mode, the processing structure, in response to actuation of an interactive input system power button, is configured to condition said interactive input system to operate in the standby mode.

34. The interactive input system of claim 32 wherein when the interactive input system is operating in the interactive mode, in the absence of user input for a third threshold period of time, the processing structure is configured to condition said interactive input system to operate in said ready_initial sub-mode.

35. The interactive input system of claim 29 wherein when the interactive input system is operating in said standby mode, no image is presented on said interactive surface.

36. The interactive input system of claim 34 wherein when the interactive input system is operating in said standby mode, no image is presented on said interactive surface.

37. The interactive input system of claim 36 wherein when the interactive input system is operating in said ready_initial sub-mode, a dim user interface is presented on said interactive surface.

38. The interactive input system of claim 37 wherein when the interactive input system is operating in said ready_final sub-mode, the status indicator is brightly presented on said interactive surface.

* * * * *